US012689707B2

(12) United States Patent
   Abhishek

(10) Patent No.: US 12,689,707 B2
(45) Date of Patent: Jul. 21, 2026

(54) THREE-DIMENSIONAL VISUAL COMMUNICATION SESSIONS

(71) Applicant: AT&T Intellectual Property I, L.P., Atlanta, GA (US)

(72) Inventor: Rohit Abhishek, Cumming, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 325 days.

(21) Appl. No.: 17/982,515

(22) Filed: Nov. 7, 2022

(65) Prior Publication Data

US 2024/0155072 A1 May 9, 2024

(51) Int. Cl.
| | |
|---|---|
| *H04N 7/14* | (2006.01) |
| *G06V 10/74* | (2022.01) |
| *H04N 13/128* | (2018.01) |
| *H04N 13/351* | (2018.01) |

(52) U.S. Cl.
CPC .......... H04N 7/147 (2013.01); G06V 10/761 (2022.01); H04N 13/128 (2018.05); H04N 13/351 (2018.05)

(58) Field of Classification Search
CPC .... H04N 7/147; H04N 13/128; H04N 13/351; H04N 13/243; H04N 23/90; H04N 13/296; H04N 13/194; H04N 13/178; H04N 13/279; H04N 13/344; G06V 10/761; G06V 2201/12; G06V 20/20; G06T 7/593; G06T 7/579; G06T 2207/10028; H04L 65/403; H04S 3/008; H04S 7/30; H04R 3/001; H04R 5/021; H04R 2420/07

USPC .................................................. 348/14.01–16
See application file for complete search history.

(56) References Cited

U.S. PATENT DOCUMENTS

| | | | | |
|---|---|---|---|---|
| 11,127,146 | B2 * | 9/2021 | Doyen | ................. H04N 13/232 |
| 12,380,418 | B2 * | 8/2025 | Cella | ...................... B33Y 50/02 |
| 2009/0142041 | A1 * | 6/2009 | Nagasawa | .............. H04N 19/44 |
| | | | | 348/42 |
| 2010/0272417 | A1 * | 10/2010 | Nagasawa | ............ H04N 13/183 |
| | | | | 386/239 |
| 2010/0275238 | A1 * | 10/2010 | Nagasawa | ............ H04N 13/194 |
| | | | | 348/E13.001 |

(Continued)

FOREIGN PATENT DOCUMENTS

| | | | | | |
|---|---|---|---|---|---|
| CN | 103096018 | A | * | 5/2013 | ............. H04N 7/142 |
| CN | 104813669 | A | * | 7/2015 | ........... H04N 13/161 |

OTHER PUBLICATIONS

Text Translation of CN-103096018-A (Year: 2013).*

(Continued)

*Primary Examiner* — Duc Nguyen

(57) ABSTRACT

In a first example, a processing system may transmit one or more reception parameters for a video call, where the one or more reception parameters include a first depth parameter defining a first depth of video content that the processing system is to display. The processing system may then receive the video content in accordance with the first depth parameter and present the video content in accordance with the first depth parameter. In a second example, a processing system may detect a bandwidth constraint for a transmission of video content for a video call, select a first depth parameter based upon the bandwidth constraint, and transmit a video stream comprising the video content in accordance with the first depth parameter.

20 Claims, 4 Drawing Sheets

(56) References Cited

U.S. PATENT DOCUMENTS

| | | | |
|---|---|---|---|
| 2013/0113879 A1* | 5/2013 | Chen | H04N 13/194 |
| | | | 348/43 |
| 2014/0169562 A1* | 6/2014 | Billonneau | H04L 63/04 |
| | | | 380/270 |
| 2015/0036051 A1* | 2/2015 | Broberg | G06T 7/0002 |
| | | | 348/571 |
| 2015/0269736 A1* | 9/2015 | Hannuksela | H04N 13/395 |
| | | | 345/419 |
| 2017/0105053 A1* | 4/2017 | Todd | H04N 21/482 |
| 2019/0019303 A1* | 1/2019 | Siver | G01S 17/08 |
| 2020/0288112 A1* | 9/2020 | Sheng | H04N 13/296 |
| 2020/0304773 A1* | 9/2020 | Tomkevicius | H04N 13/128 |
| 2021/0192737 A1* | 6/2021 | Zhou | G06T 7/285 |
| 2021/0201466 A1* | 7/2021 | Chen | G06V 10/993 |
| 2021/0243416 A1* | 8/2021 | Fuchikami | H04N 9/3185 |
| 2021/0256665 A1* | 8/2021 | Furusawa | G01C 3/085 |
| 2021/0319581 A1* | 10/2021 | Hur | G06T 17/00 |
| 2021/0392296 A1* | 12/2021 | Rabinovich | G06T 15/20 |

OTHER PUBLICATIONS

Text Translation of CN-104813669-A (Year: 2015).*

Mirkamali, S.S., et al., "Depth-Wise Layering of 3D Images Using Dense Depth Maps: A Threshold Based Approach", International Journal of Machine Intelligence, IJMI, vol. 3, Issue 4, 2011, pp. 199-203.

Microsoft Learn, "Azure Kinect DK Depth Camera", Sep. 21, 2022, accessed from https://learn.microsoft.com/en-us/azure/kinect-dk/depth-camera, 7 pages.

Intel, Real Sense, Beginner's Guide to Depth [Updated], Jul. 15, 2019, accessed from https://www.intelrealsense.com/beginners-guide-to-depth/, 6 pages.

ACM SIGGRAPH Blog, "How Google Is Making Streamable Light Field Video a Reality", Aug. 2020, accessed from https://blog.siggraph.org/2020/08/how-google-is-making-streamable-light-field-video-a-reality.html/, 9 pages.

Davis, K., et al., "VoIP Protocols: SIP and H.323", Cisco Press, Nov. 20, 2019, accessed from https://www.ciscopress.com/articles/article.asp?p=3100060&seqNum=3, 15 pages.

Noworatzky, D., "Know your protocols: VoIP protocols that work together with SIP", TeleDynamics Think Tank, Feb. 13, 2019, accessed from https://info.teledynamics.com/blog/know-your-protocols-voip-protocols-that-work-together-with-sip, 10 pages.

Huitema, C., Real Time Control Protocol (RTCP) attribute in Session Description Protocol (SDP), Network Working Group, RFC 3605, Oct. 2003, 10 pages.

Iana, Session Description Protocol (SDP) Parameters, Internet Assigned Numbers Authority, accessed from https://www.iana.org/assignments/sdp-parameters/sdp-parameters.xhtml on Oct. 17, 2022, 25 pages.

Dorodnicov, S., "The Basics of Stereo Depth Vision", INTEL, Real Sense, Jul. 17, 2018, accessed from https://www.intelrealsense.com/stereo-depth-vision-basics/, 8 pages.

Owl Labs, "The Future of Hybrid Workplaces", BlueJeans by Verizon, visited https://www.bluejeans.com/partners/owl-labs on May 31, 2023, 7 pages.

* cited by examiner

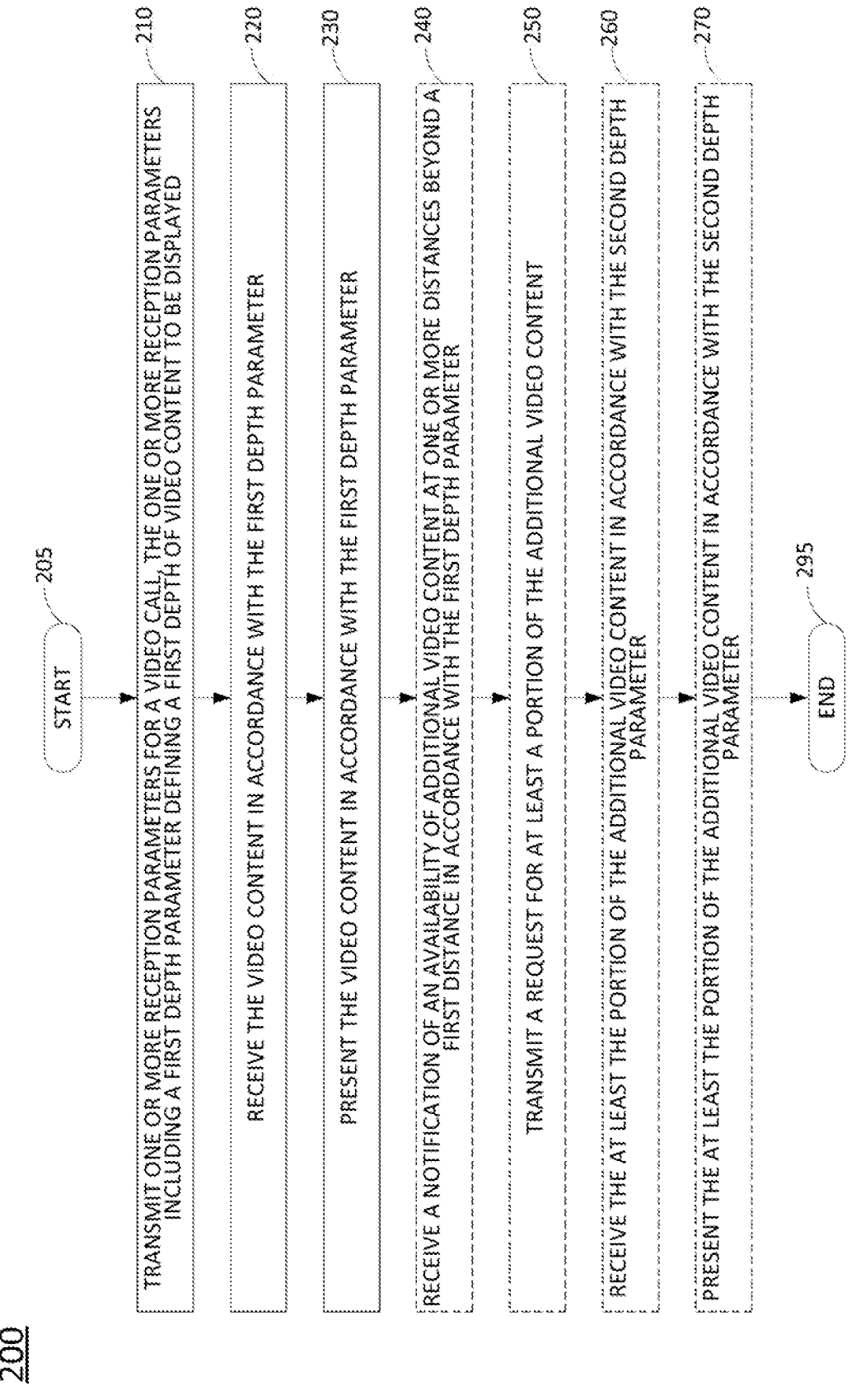

200

START ~205

TRANSMIT ONE OR MORE RECEPTION PARAMETERS FOR A VIDEO CALL, THE ONE OR MORE RECEPTION PARAMETERS INCLUDING A FIRST DEPTH PARAMETER DEFINING A FIRST DEPTH OF VIDEO CONTENT TO BE DISPLAYED ~210

RECEIVE THE VIDEO CONTENT IN ACCORDANCE WITH THE FIRST DEPTH PARAMETER ~220

PRESENT THE VIDEO CONTENT IN ACCORDANCE WITH THE FIRST DEPTH PARAMETER ~230

RECEIVE A NOTIFICATION OF AN AVAILABILITY OF ADDITIONAL VIDEO CONTENT AT ONE OR MORE DISTANCES BEYOND A FIRST DISTANCE IN ACCORDANCE WITH THE FIRST DEPTH PARAMETER ~240

TRANSMIT A REQUEST FOR AT LEAST A PORTION OF THE ADDITIONAL VIDEO CONTENT ~250

RECEIVE THE AT LEAST THE PORTION OF THE ADDITIONAL VIDEO CONTENT IN ACCORDANCE WITH THE SECOND DEPTH PARAMETER ~260

PRESENT THE AT LEAST THE PORTION OF THE ADDITIONAL VIDEO CONTENT IN ACCORDANCE WITH THE SECOND DEPTH PARAMETER ~270

END ~295

THREE-DIMENSIONAL VISUAL COMMUNICATION SESSIONS

The present disclosure relates generally to three-dimensional visual communication sessions, e.g., video calls, and more particularly to methods, non-transitory computer-readable media, and apparatuses for receiving and presenting video content in accordance with a first depth parameter, and to methods, non-transitory computer-readable media, and apparatuses for transmitting video content in accordance with a first depth parameter.

BACKGROUND

Immersive media is defined by immersive technologies that attempt to create, or imitate the physical world through digital simulation, thereby simulating any or all human sensory systems to create the perception of the user being physically present inside the scene. Some examples of immersive media technologies include: virtual reality (VR), augmented reality (AR), mixed reality (MR), light field/holographic display technology, and so forth. VR refers to a digital environment replacing the user's physical environment by using a headset or one or more other display devices to place the user in a computer-generated world. AR, on the other hand, takes digital media and layers it on the real world around a user by using either a clear-vision display, a smartphone, or the like. MR refers to the blending of the real world with the digital world, thereby creating an environment in which technology and the physical world can co-exist.

SUMMARY

In one example, the present disclosure describes a method, non-transitory computer-readable medium, and apparatus for receiving and presenting video content in accordance with a first depth parameter. For instance, a processing system including at least one processor may transmit one or more reception parameters for a video call, where the one or more reception parameters include a first depth parameter defining a first depth of video content that the processing system is to display. The processing system may then receive the video content in accordance with the first depth parameter and present the video content in accordance with the first depth parameter.

In another example, the present disclosure describes a method, non-transitory computer-readable medium, and apparatus for transmitting video content in accordance with a first depth parameter. For instance, a processing system including at least one processor may detect a bandwidth constraint for a transmission of video content for a video call, select a first depth parameter based upon the bandwidth constraint, and transmit a video stream comprising the video content in accordance with the first depth parameter.

BRIEF DESCRIPTION OF THE DRAWINGS

The teachings of the present disclosure can be readily understood by considering the following detailed description in conjunction with the accompanying drawings, in which:

FIG. 2 illustrates an example method for receiving and presenting video content in accordance with a first depth parameter;

To facilitate understanding, identical reference numerals have been used, where possible, to designate identical elements that are common to the figures.

DETAILED DESCRIPTION

Figure 1:
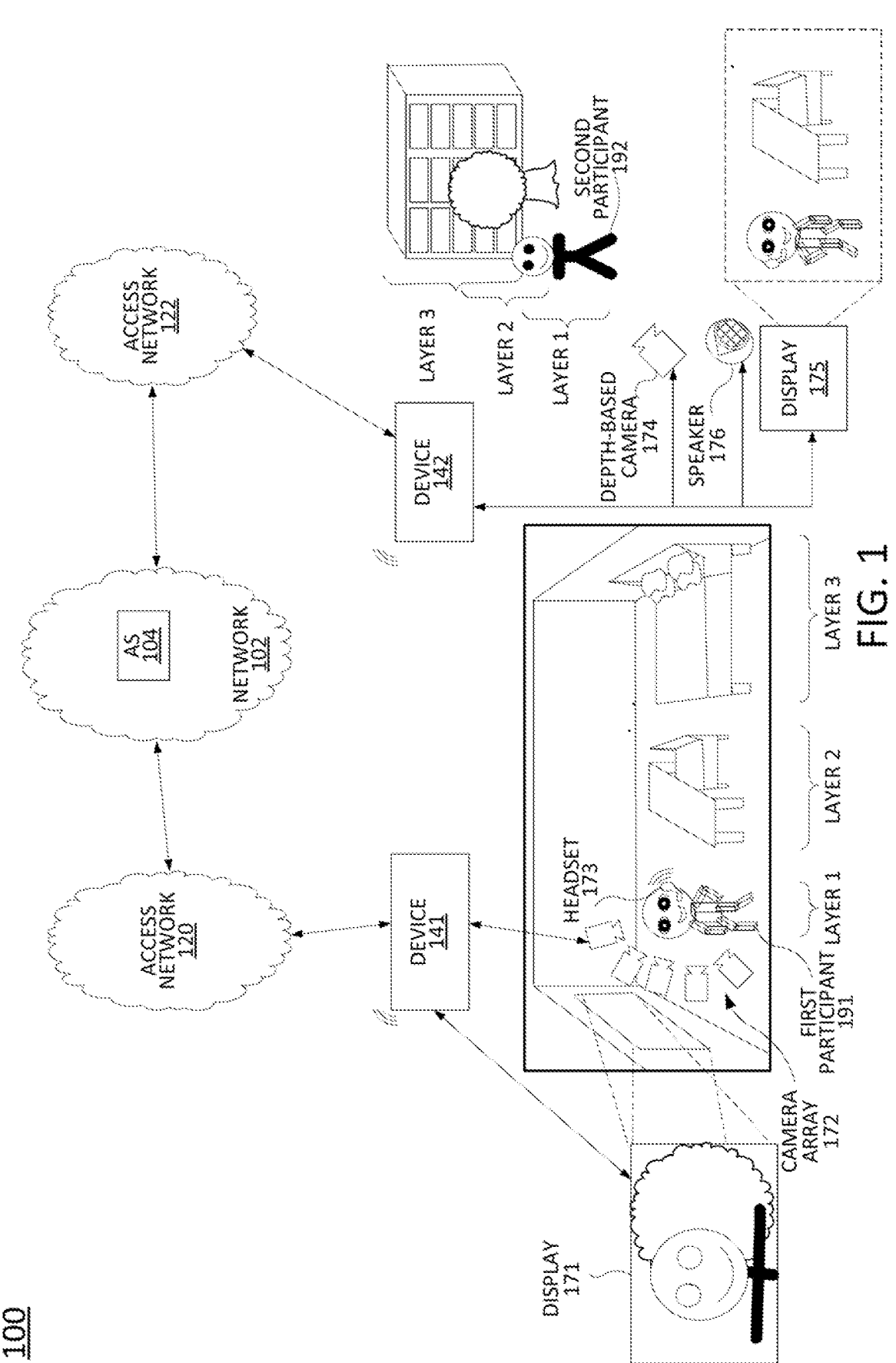
FIG. 1 illustrates an example network related to the present disclosure.

Examples of the present disclosure describe visual communication sessions, e.g., video calls, in which the video content includes three-dimensional (3D) depth information. Three dimensional video may include video content that is captured via a holographic camera, a depth-based camera, and/or a multi-view camera, or the like. It should be noted that as described herein, a video call may include a call between at least two parties (e.g., two or more participants) in which a stream of video content of at least one of the participants is streamed to at least one other participant. For instance, video content with depth information (broadly 3D video content) may be captured and streamed by one participant, while another participant may receive and display at least a portion of the 3D video content but may only transmit voice/audio during the call. In one example, the present disclosure describes call signaling messages for selecting and negotiating depth information and other parameters associated with 3D video calls, where the capturing/transmitting devices and the receiving devices may have different capabilities, user preference, and so forth.

In accordance with the present disclosure, devices for capturing 3D video content for a video call may include a depth-based camera, or an array of multiple depth-based cameras, an array of multiple two-dimensional cameras, e.g., a multi-view camera (e.g., capturing multiple images from different angles from which depth information may be derived), or the like. It should again be noted that some participants may not utilize a camera or array that is 3D capable. In one example, the present disclosure may enable notification of device capabilities as part of or in connection with the same signaling that is used for communicating depth information/parameters. For instance, an endpoint device may signal that it is not capable of providing 3D video content (e.g., 2D only). Thus, other endpoint devices may refrain from requesting a depth parameter for the video content of a video stream from such an endpoint device in connection with a call. Similarly, in accordance with the present disclosure, devices for rendering and displaying 3D video content may include 3D ray-based displays, multi-view displays, AR, VR, and/or MR devices, 2D displays (e.g., where 2D projections of 3D video content may be displayed), and so forth.

To further illustrate, light-field/holographic technologies capture light rays in 3D space with rays coming from each point and direction. This is based on the concept that any perceived object is illuminated by light coming from any source, traveling via space and hitting the object's surface where the light is partly absorbed and partly reflected to another surface before reaching eyes or a recording device. In addition, having a light field properly reproduced via a display device may provide user with 3D effects such as binocularity and continuous motion parallax. In one example, light-field displays may comprise a large array of projection modules projecting light rays onto a holographic screen to reproduce the approximation of the light-field by showing different but consistent information in slightly different directions. Light rays may be defined by five-dimensional plenoptic functions, where each ray may be defined by three coordinates in 3D space (three dimensions) and two angles to specify the direction in 3D space.

To capture the content for 360-degree video, a 360-degree camera is used. However, for capturing content for light-field/holographic displays, a setup may include multiple-depth camera(s) or an array of cameras, which may depend on the field of view (FoV) of the scene to be rendered. Notably, a traditional camera may capture a 2D representation of the light rays that reach the camera lens at a given position. The image sensor records the sum of the brightness and color of all light rays reaching each pixel. In contrast, capturing content for light field or holographic-based displays may utilize a light field camera, which can capture not only the brightness and color but also the direction of all light rays reaching the camera sensors. Using this information, a digital scene may be reconstructed with an accurate representation of the origin of each light ray, making it possible to reconstruct the exact captured scene digitally in 3D. A first technique to capture such volumetric scenes uses an array of cameras or camera modules to capture different rays/views from each direction. Another example technique may use a depth camera that can capture 3D information in a single exposure without requiring structured illumination by measuring the depth of multiple objects under controlled lighting conditions.

In one example, a viewing participant of a 3D video call may choose to view 3D video content of another participant up to a requested depth. For instance, the endpoint device of the viewing participant may communicate a request for video content up to a specified depth (e.g., a distance from a video/image capturing apparatus). In one example, the specified depth may be based upon a detected network bandwidth (e.g., with more bandwidth, a greater depth may be selected—with less bandwidth, a lesser depth may be selected). The endpoint device of the viewing participant may alternatively or additionally select a depth based on a load of the endpoint device (e.g., processor utilization, memory utilization, network bandwidth utilization being shared with other processes and/or applications, and so forth). In one example, a viewing user may manually specify a depth. For instance, even if the device workload and network bandwidth permit a greater depth, the user may prefer to obtain and display less visual data. For example, the network connection may be metered and the user may wish to save network data access utilization for other uses, or the call may simply be unimportant and the user may wish to enable greater network access bandwidth for other devices (e.g., devices of other family members in a same home, or the like).

In one example, captured 3D video content for a video call may be separated into multiple depth layers, e.g., a foreground and multiple background layers at different depths. For instance, a first layer (e.g., at a first depth) may include captured imagery of a first participant. The 3D video content may also be segregated into multiple additional layers at different distances/depths (or ranges thereof) from the 3D image capturing apparatus. In one example, a viewing participant (e.g., another party to the call) may choose to view the first layer, or multiple layers including the first layer. For instance, the endpoint device of the viewing participant may select a number of layers to receive and display based upon the same or similar criteria as noted above, such as a detected network bandwidth (e.g., with more bandwidth, more layers may be selected—with less bandwidth, fewer layers may be selected). The endpoint device of the viewing participant may alternatively or additionally select a number of layers based on a load of the endpoint device (e.g., processor utilization, memory utilization, network bandwidth utilization being shared with other processes and/or applications, and so forth). In one example, a viewing user may manually specify a number of layers. For instance, even if the device workload and network bandwidth permit a greater number of layers, the user may prefer to obtain and display fewer layers due to network connection metering, consideration of other users and/or devices sharing a network connection, and so forth.

In one example, a depth parameter (e.g., a depth preference/requested depth) may be requested by an endpoint device of a viewing participant via call signaling message. For instance, as part of a call setup, a Session Initiation Protocol (SIP) message with a Session Description Protocol (SDP) payload may be sent by the endpoint device of the viewing participant with one or more parameters defining a requested depth. For instance, where the 3D video content is layered, this may be in the form of "a=foreground: <value_1>" and "a=background:<value_2>." Where value_1 may be 0 or 1, and value_2 may be an integer from 0 up to a number of available layers. Alternatively, where the 3D video content is not layered, this may be in the form of "a=depth:<value_1>" where value_1 may range from 0 up to a maximum depth (e.g., a focal "infinity" which may be approximated as 3 meters, 5 meters, 10 meters, etc., which may depend on the particular system configuration).

In one example, a video call may comprise one or more Real Time Protocol (RTP) streams for conveying the video content. In one example, a capturing/sending device may use a Real Time Control Protocol (RTCP) report from a receiver and may select a depth parameter based upon the RTCP report. For instance, the RTCP report may include the network bandwidth from the perspective of the receiver. In other words, the sender may change the depth parameter in response to changes in detected bandwidth. In one example, additional SDP signaling (e.g., over SIP) may be used to convey the change. Alternatively, the receiver may detect a change in bandwidth and may request a change in the depth parameter, e.g., via additional SDP signaling (e.g., over SIP).

As noted above, some receiver devices may have limited-capability displays, such as a 2D display screen or an AR/VR headset. In one example, a capturing/sending device may have a converter for converting captured 3D video to a flat 2D video or 360 degree video. In another example, a network-based element, such as a media resource function (MRF)/multipoint control unit (MCU) (broadly a transcoding server) may perform such a conversion. In one example, the capturing/sending device may use a SIP/SDP offer/answer to discover the receiver's display type. Based on the display type, the capturing sending/device may send the video content in the appropriate format. To illustrate, SDP signaling for the display type may be described as: "a=display_type<value>" where the value may be "3D," "multi-view," "360," "2D," or the like. Similarly, if the display type is "3D" or "multi-view," the field of view may also be signaled via SDP, such as: "a=3D_fov:<value>."

In addition to a depth parameter, a capturing/sending device may also convey information regarding a number of cameras/views and/or other camera configuration(s), which may help a receiver device in reconstructing a scene. To illustrate, in different embodiments, the 3D video content may include multi-view-based transmission, converting the scene into 3D assets and sending it to the user, or depth based camera content. The sender may select the type of video based on a response, e.g., via SDP offer/answer, indicating the receiver display type. In an example in which a multi-view-based approach is used, the sender may communicate the number of views to the receiver for proper rendering. This may be sent via SIP/SDP in an example format such as: "a=total_views: <value>." In one example in which the 3D video content is separated into layers, different streams may be used to convey different layers (e.g., different RTP streams). In one example, the SIP/SDP signaling may indicate which streams are associated with which layers (e.g., indicating corresponding depths for placement/rendering of the video content when reconstructing the 3D video content from multiple component streams).

Holographic or similar 3D telepresence may advance the utility of diverse types of communications. In telemedicine, for example, telepresence can allow medical professionals to advise and assist colleagues thousands of miles away in real time. The technology can also reduce the necessity of travel for business meetings and facilitate distance education and training. Other potential applications include enhanced movies and television programming, advertising, gaming, 3D mapping, aerospace navigation, robot control, and various other forms of simulation. Examples of the present disclosure may drive further adoption of such uses by addressing the realities of a heterogeneous ecosystem of endpoint devices with different capabilities, network unpredictability, as well as user preferences. These and other aspects of the present disclosure are described in greater detail below in connection with the examples of FIGS. 1-4.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., in accordance with 3G, 4G/long term evolution (LTE), 5G, etc.), and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet services, and video content services (such as television services) to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), a streaming server, an interactive video/video on demand (VoD) server, and so forth.

Figure 4:
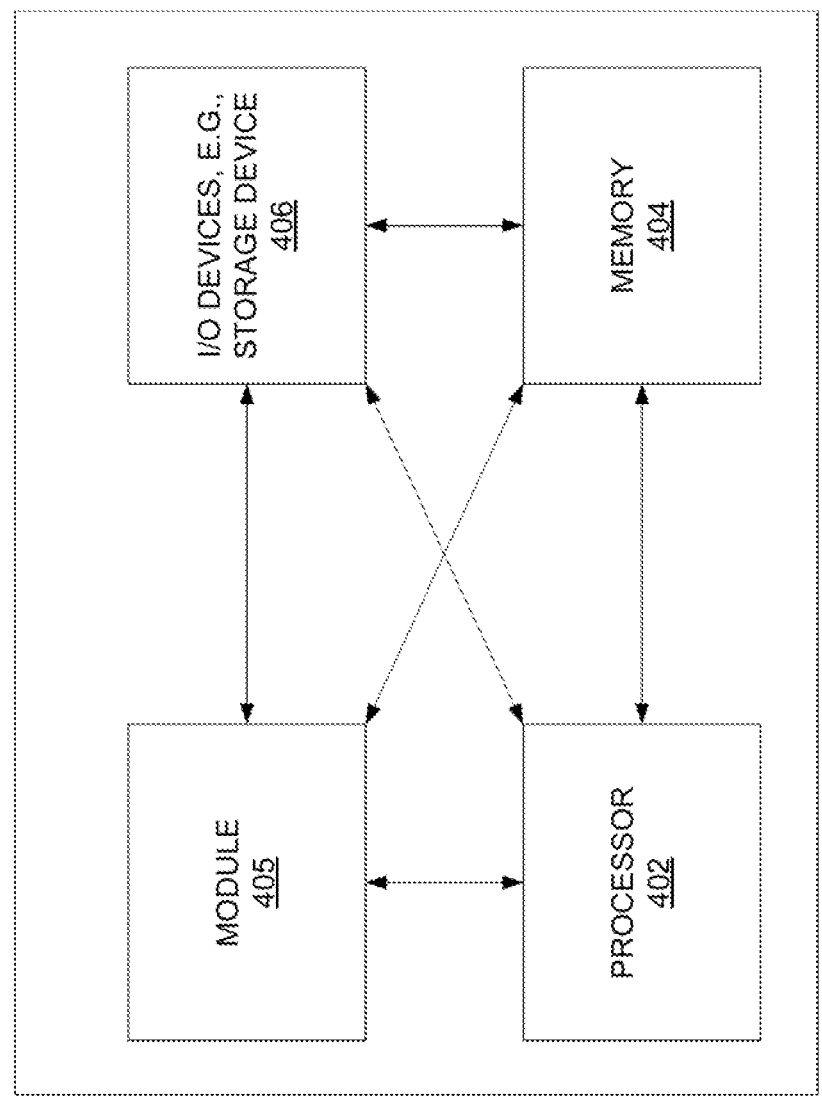
FIG. 4 illustrates a high level block diagram of a computing device specifically programmed to perform the steps, functions, blocks and/or operations described herein.

In accordance with the present disclosure, application server (AS) 104 may comprise a computing system or server, such as computing system 400 depicted in FIG. 4, and may be configured to provide one or more operations or functions for receiving and presenting video content in accordance with a first depth parameter and/or transmitting video content in accordance with a first depth parameter, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

Thus, although only a single application server (AS) 104 is illustrated, it should be noted that any number of servers may be deployed, and which may operate in a distributed and/or coordinated manner as a processing system to perform operations for receiving and presenting video content in accordance with a first depth parameter and/or transmitting video content in accordance with a first depth parameter, in accordance with the present disclosure. In one example, AS 104 may comprise a physical storage device (e.g., a database server), to store various types of information in support of systems for receiving and presenting video content in accordance with a first depth parameter and/or transmitting video content in accordance with a first depth parameter, in accordance with the present disclosure. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/ Wi-Fi network and the like), cellular access networks, 3 rd party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and others may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access network 120 may be in communication with a device 141. Similarly, access network 122 may be in communication with one or more devices, e.g., device 142. Access networks 120 and 122 may transmit and receive communications between devices 141 and 142, between devices 141 and 142, and application server (AS) 104, other components of network 102, devices reachable via the Internet in general, and so forth. In one example, devices 141 and 142 may each comprise programs, logic or instructions for receiving and presenting video content in accordance with a first depth parameter and/or transmitting video content in accordance with a first depth parameter. For instance, in one example, devices 141 and 142 may each comprise a computing system or device, such as computing system 400 depicted in FIG. 4, and may be configured to perform operations or functions for receiving and presenting video content in accordance with a first depth parameter and/or transmitting video content in accordance with a first depth parameter, as described herein. In one example, either or both of devices 141 and 142 may comprise any single device or combination of devices that may comprise customer premises equipment and/or a user endpoint device, e.g., a mobile computing device, a cellular smart phone, a laptop, a tablet computer, a desktop computer, an application server, a bank or cluster of such devices, a router, a gateway, and the like. In one example, devices 141 and 142 may be equipped for cellular and/or non-cellular wireless communication, as well as wired communication with various devices in local environments (e.g., within wireless communication range and/or having a wired connection to the respective devices 141 and 142). For instance, devices 141 and 142 may include transceivers for wireless communications, e.g., for Institute for Electrical and Electronics Engineers (IEEE) 802.11 based communications (e.g., "Wi-Fi"), IEEE 802.15 based communications (e.g., "Bluetooth", "ZigBee", etc.), cellular communication (e.g., 3G, 4G/LTE, 5G, etc.), and so forth.

In one example, the device 141 is associated with a first participant 191. As illustrated in FIG. 1, device 141 may be in communication with a number of local devices, such as display 171 (e.g., a display screen, projector, or the like), a camera array 172 comprising a plurality of cameras (e.g., a multi-view camera), a headset 173 (e.g., a wireless having a microphone and earpiece/speaker, etc.), and so forth. Collectively, these local devices may provide a user interface for the first participant 191 to engage in a video call. It should be noted that in one example, device 141 may comprise a personal computer, a laptop computer, or the like, which may further possess a keyboard, mouse, etc. to enable the first participant 191 to establish a video call via additional inputs and interactions. For instance, the first participant 191 may log-in to a video call application on device 141 for initially establishing a video call, but may then use display 171, camera array 172, and/or headset 173 to actively participate in the video call itself. Display 171 may present video content of one or more other participants to a video call, as described in greater detail below. However, it is should be noted that in one example, display 171 may comprise a 2D display, such as a liquid-crystal display, a light-emitting diode display, etc. In one example, the components associated with the first participant 191 that are used to establish and support a visual communication session (e.g., a video call) may be referred to as a "communication system." For instance, a communication system may comprise device 141, or device 141 in conjunction with display 171, camera array 172, headset 173, and so on.

Similarly, device 142 may be associated with a second participant 192, and may be of a same or similar nature as device 141. As illustrated in FIG. 1, device 142 may be in communication with a number of local devices, such as depth-based camera 174, display 175 (e.g., a holographic projector, a light field display, or the like), speaker 176, and so forth. Collectively, these local devices may provide a user interface for the second participant 192 to engage in a video call.

In one example, devices 141 and 142 may communicate with each other and/or with AS 104 to establish, maintain/operate, and/or tear-down a visual communication session, or video call. In one example, AS 104, device 141, and/or device 142 may operate in a distributed and/or coordinated manner to perform various steps, functions, and/or operations described herein. To illustrate, AS 104 may establish and maintain visual communication sessions for various participants and may store and implement one or more configuration settings specifying both inbound and outbound modifications of visual content from the various users. The visual content may comprise video content, which may include visual imagery of a physical environment (e.g., including imagery of one or more users), and which in some cases may further include recorded audio of the physical environment.

In one example, AS 104 may receive a request to establish a visual communication session from device 141 and/or device 142. The request may be received via access network 120, access network 122, network 102, and/or the Internet in general, and the visual communication session may be provided via any one or more of the same networks. The establishment of the visual communication session may include providing security keys, tokens, certificates, or the like to encrypt and to protect the media streams between devices 141 and 142 when in transit via one or more networks, and to allow devices 141 and 142 to decrypt and present received video content via display 171 and display 175, respectively (and similarly for audio information via headset 173, speaker 176, or the like). In one example, the establishment of the visual communication session may further include reserving network resources of one or more networks (e.g., network 102, access networks 120 and 122, etc.) to support a particular quality of service (QoS) for the visual communication session (e.g., a certain video resolution, a certain delay measure, and/or a certain packet loss ratio, and so forth). Such reservation of resources may include an assignment of slots in priority queues of one or more routers, the use of a particular QoS flag in packet headers which may indicate that packets should be routed with a particular priority level, the establishment and/or use of a certain label-switched path with a guaranteed latency measure for packets of the visual communication session, and so forth.

In one example, AS 104 may establish a communication path such that media streams between device 141 and device 142 pass via AS 104, thereby allowing AS 104 to implement modifications to the visual content in accordance with one or more configuration setting(s). The one or more configuration settings may be user-specified, may be based upon the capabilities of devices of the first participant 191 and/or the second participant 192 being used for the visual communication session, may be based upon a network bandwidth, e.g., between device 141 and access network 120, network 102, and/or AS 104, etc. (and similarly for device 142), may be specific to the context (e.g., a relationship between the participants, an indication of one or both of the participants of the importance of the call, a subject matter of the call, etc.), and so forth.

As just one example, device 141 may provide information regarding the capabilities and capacities of device 141, display 171, and camera array 172 to AS 104 in connection with a request to establish a visual communication session with device 142. AS 104 may send a notification of the request to device 142. Similarly, device 142 may provide information regarding the capabilities and capacities of device 142, depth-based camera 174, and display 175 to AS 104 in connection with a response to the request/notification to establish the visual communication session. Accordingly, in one example, AS 104 may identify any transcoding that may be applied to the visual communication session. For instance, AS 104 may comprise a media resource function (MRF)/multipoint control unit (MCU) (broadly a transcoding server) for performing such a conversion. For instance, as noted above, some receiver devices may have limited-capability displays, such as a 2D display (e.g., display 171). As such, AS 104 may convert 3D video captured via depth-based camera 174 to a flat 2D video or 360 degree video for presentation via display 171.

In accordance with the present disclosure, the first participant 191 and the second participant 192 (and/or the devices 141 and 142) may also select depth parameters for respective receive video streams. For instance, as illustrated in FIG. 1, the first participant 191 is in an environment in which there are a number of objects and/or physical features behind the first participant 191 in a direction in which the camera array 172 is facing. Notably, camera array 172 may capture video with depth information (broadly, "3D video" or "volumetric video") such that the distances between the camera array 172 and the first participant 191, as well as these other objects/physical features, are quantified in the captured 3D video content. As such, the second participant 192 and/or device 142 may select to receive video content of the first participant 191 up to a specified depth. It should be noted that this may be less than a maximum available depth of the video content captured via the camera array 172. For instance, the maximum depth may be the distance of the wall behind the bed. Alternatively, the maximum depth may be a pre-set representation of infinite depth (e.g., 100 meters, etc.). For example, the 3D video capture/recording format may record all points that are at 100 meters or beyond to be at 100 meters.

In one example, the captured 3D video may be segregated into layers. The number of layers may be set in advance and may have fixed sizes (e.g., a range of distances from the camera array 172), or may be selected based upon an object detection algorithm that may detect complete objects (such as a desk, a chair, a bed, etc.), and may place the objects into selected layers based on logical rules. For instance, the chair and desk behind the first participant 191 are close together and may be assigned to a same layer, while the bed may clearly be separated from these other objects by a greater distance and may be placed in a different layer. In one example, this may prevent the 3D video content being transmitted to device 142 from including partial objects. Rather, objects may be assigned to layers and the entire object may be conveyed if such layer is selected. In the example of FIG. 1, there may be three layers available (layers 1-3) containing (1) imagery of the first participant

191, (2) the desk and chair, and (3) the bed, respectively. For illustrative purposes, the second participant 192 and/or device 142 may select two layers (or up to layer 2). Thus, as shown in FIG. 1, the display 175 is presenting video content comprising imagery of the first participant 191, as well as the desk and chair. Alternatively, the second participant 192 and/or device 142 may select a depth that includes the desk and chair.

In one example, AS 104 may receive the entire captured 3D video content from camera array 172, and may extract the layers and/or the video content up to the specified depth, and may transmit the same to device 142 (e.g., removing or blocking captured imagery of unwanted layers). Alternatively, AS 104 may communicate the depth parameter to device 141, which may extract and/or drop video content prior to uploading. In any case, AS 104 may convey the 3D video content to device 142 for presentation via display 175. Similarly, the first participant 191 and/or device 141 may select to receive video content of the second participant 192 up to a specified depth (e.g., in terms of a number of available layers and/or a specified distance). For instance, as illustrated in FIG. 1, there may be three layers (layers 1-3) containing (1) the second participant 192, (2) a tree, and (3) a building, respectively. For illustrative purposes, the first participant 191 and/or device 141 may select two layers (or up to layer 2; alternatively, a specified distance/depth that includes at least a portion of the tree). Thus, as shown in FIG. 1, the display 171 is presenting video content comprising imagery of the second participant 192, as well part of the tree (e.g., the building is removed or blocked (e.g., the corresponding pixel or voxel information is removed and/or replaced with a default value) since this captured imagery is part of an unwanted layer).

It should be noted that AS 104 may receive the entire captured 3D video content from depth-based camera array 174, and may extract the layers and/or the video content up to the specified depth and transmit the same to device 141. Alternatively, AS 104 may communicate the depth parameter to device 142, which may extract and/or drop video content prior to uploading. In any case, AS 104 may convey the video content to device 141 for presentation via display 171. It should be noted that in one example, AS 104 may also apply transcoding operations to the video content. For instance, the display 171 comprises a 2D display. As such, AS 104 may convert 3D video captured via depth-based camera 174 to a flat 2D video or 360 degree video for presentation via display 171.

The foregoing describes an example in which AS 104 remains in the media path for the video call/visual communication session. However, in another example, AS 104 may be involved in call establishment, but the media streams may only be between device 141 and device 142 directly (e.g., encrypted media streams between devices 141 and 142, where no intermediate, network-based devices process the media streams other than for routing purposes). Thus, it should be noted that in one example, device 141 and/or device 142 may provide transcoding operations (e.g., from 3D video to 2D video, or the like), may perform video content extraction (e.g., by depth and/or layer), and so forth.

As noted above, configuration parameters for a video call, including depth parameters, may be requested by endpoint devices of viewing participants via call signaling message. For instance, as part of a call setup, Session Initiation Protocol (SIP) messages with Session Description Protocol (SDP) payloads may be sent by the devices 141 and 142 with one or more parameters defining requested depths (e.g., an integer from 0 up to a number of available layers, a number from 0 up to a maximum depth, or the like). In addition, the SDP payloads may include the capabilities of display 171 and camera array 172, and similarly the capabilities of display 175 and depth-based camera 174, which may be used for activating any transcoding capabilities that may be called for.

In one example, additional SDP signaling during a call may be used to change one or more configuration settings (e.g., a depth parameter). For instance, the second participant 192 may be at a landmark building and may encourage the first participant 191 to request to see additional layer(s)/ depth to share the view. As such, the first participant 191 may cause device 141 to request layer 3 from the video content of the second participant 192, e.g., via one or more additional SIP/SDP messages. Alternatively, or in addition, as noted above, a video call may comprise one or more RTP streams for conveying the video content. In one example, device 141 may transmit an RTCP report to device 142. In response, device 142 may select a depth parameter based upon the RTCP report. For instance, the RTCP report may include the network bandwidth from the perspective of the receiver device 141. In other words, the device 142 may change the depth parameter in response to changes in detected bandwidth. In one example, additional SDP signaling (e.g., over SIP) may be used to convey the change. For instance, in this example, device 142 may initiate the change and may message device 141 to expect additional video content (e.g., additional layer(s) and/or depth of content). Alternatively, device 141 may detect a change in bandwidth and may request a change in the depth parameter, e.g., via additional SDP signaling (e.g., over SIP).

Additional aspects of examples of the present disclosure for receiving and presenting video content in accordance with a first depth parameter and/or transmitting video content in accordance with a first depth parameter are discussed in greater detail below in connection with the example method 200 of FIG. 2 and the example method 300 of FIG. 3. It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by one or more servers deployed in access network 120 and or access network 122 (e.g., one or more edge servers), or may be provided by AS 104 in conjunction with one or more of such devices. In one example, AS 104 may provide a video call hosting service/transcoding service, e.g., an additional service that may be offered to subscribers, e.g., in addition to network access services, telephony services, video content services (such as television and/or streaming video services), and so forth via network 102.

It should be noted that FIG. 1 illustrates just two examples of user communication systems and that other, further, and different arrangements may be used in various examples. For instance, another participant may use an augmented reality (AR) headset or the like to view 3D video content of one or more other participants (e.g., smart glasses with augmented reality (AR) enhancement capabilities, such as a screen and a reflector to project outlining, highlighting, or other visual markers to the eye(s) of a participant to be perceived in conjunction with the surroundings). In various examples, such a participant may also share captured video content via a 2D camera, a multi-view camera, and/or depth-based camera, or the like. However, in another example, some participants may not share video content at all. In other words, some participants may receive 3D video streams from other participants and may converse audibly, but may not share their own video content (e.g., "camera off"). In still example, a single device may provide functions of multiple devices illustrated in FIG. 1. For instance, a desktop computing device or a mobile computing device of a user may include a depth-based camera, a display, and speaker that may be used to participate in a 3D video call.

In one example, additional parameters to be conveyed via SIP/SDP signaling messages or the like may also include field of view information (e.g., a focal direction and range of view in azimuth and/or elevation, such as for AR display of 360 degree video or the like). Thus, the capturing device(s) and/or AS 104 may restrict capture and/or transmission to visual content that is within the FoV (or a predicted FoV). However, in another example, this information may be omitted or may be limited. For instance, insofar as the present disclosure relates to video calls, participants may not be free to engage in virtual exploration of other participants' environments (e.g., the second participant 192 may not be enabled to change a perspective so as to obtain a view as if the second participant were standing behind the first participant 191).

It should be further noted that although FIG. 1 illustrates a visual communication session/video call between two participants/users, the present disclosure is not so limited. In other words, examples of the present disclosure equally apply to video calls with three or more participants (e.g., video conferences). In this regard, the video conferences may be non-hosted (e.g., peer-to-peer) where multiple video streams may be transmitted from each participant to each other participant. Alternatively, the video conferences may be hosted (e.g., via AS 104 or the like), where each participant may upload video content to AS 104 and where AS 104 may combine video content from various incoming streams into respective downlink streams. As in the foregoing examples, device capabilities, depth preferences, and the like may be conveyed via signaling messages (e.g., SIP/SDP, or the like). In one example, AS 104 may instruct video capturing apparatuses to record and/or to upload video content up to a furthest depth specified by any one of the other participants (e.g., the receivers). For instance, a first participant may request to receive video content up to a depth up of 3 meters, but another participant may request to receive up to a depth of 5 meters. Thus, video content up to at least 5 meters should be collected and uploaded for sharing with others. In one example, participants and/or their respective endpoint devices may select different depth parameters for the video content of various other partici-
pants (e.g., requesting a depth of 3 meters for video content
of a first participant, requesting a depth of 6 meters for a
second participant, etc.). Thus, these and other modifications
are all contemplated within the scope of the present disclo-
sure.

FIG. 2 illustrates a flowchart of an example method 200
for receiving and presenting video content in accordance
with a first depth parameter, in accordance with the present
disclosure. In one example, the method 200 is performed by
a component of the system 100 of FIG. 1, such as by one of
the devices 141 or 142 and/or any one or more components
thereof (e.g., a processor, or processors, performing opera-
tions stored in and loaded from a memory), or by a com-
munication system (e.g., device 141 conjunction with one or
more other devices, such as display 171, camera array 172,
etc. or similarly for device 142, depth-base camera 174,
display 175, etc.). In another example, the method 200 may
be performed by a network-based processing system, such
as 104, or multiple servers of a same or similar nature
operating as a distributed/collective processing system. In
one example, the steps, functions, or operations of method
200 may be performed by a computing device or system
400, and/or processor 402 as described in connection with
FIG. 4 below. For instance, the computing device or system
400 may represent any one or more components of the
system 100 of FIG. 1 that is/are configured to perform the
steps, functions and/or operations of the method 200. Simi-
larly, in one example, the steps, functions, or operations of
method 200 may be performed by a processing system
comprising one or more computing devices collectively
configured to perform various steps, functions, and/or opera-
tions of the method 200. For instance, multiple instances of
the computing device or processing system 400 may col-
lectively function as a processing system. For illustrative
purposes, the method 200 is described in greater detail
below in connection with an example performed by a
processing system. The method 200 begins in step 205 and
proceeds to step 210.

At step 210, the processing system transmits one or more
reception parameters for a video call, the one or more
reception parameters including a first depth parameter defin-
ing a first depth of video content that the processing system
is to display. In one example, the one or more reception
parameters are transmitted in at least one call setup signaling
message. In one example, the at least one call setup signaling
message may comprise an SDP message (e.g., an SDP
payload in a SIP message, also referred to herein as SIP/
SDP). In one example, the processing system may be of an
endpoint device that initiates the call. In such case the at
least one signaling message may also be for initiating the
call. In another example, the endpoint device of the pro-
cessing system may be initially called by another, and may
send one or more signaling messages containing the one or
more reception parameters in reply. In one example, an
endpoint device associated with the video content capture
may indicate its limitations and/or external constraints as
part of the signaling (e.g., a bandwidth constraint, a depth
constraint that may be derived from the bandwidth con-
straint or other factors, etc.). For instance, the endpoint
device of another participant may be in a location with a
low-bandwidth network connection, the endpoint device
may be in use for other applications and may not support
real-time streaming of more content, and so forth.

In one example, the first depth parameter specifies a
maximum distance from a viewing perspective of the video
content. In one example, the first depth parameter may be defined as a number of layers of the video content, e.g., as
described above. In an example in which the video content
is layered, at least three layers of the video content may be
available for selection by the processing system. In one
example, the one or more reception parameters may further
include a display capability of the processing system. In one
example, the one or more reception parameters may further
include a video type. For instance, the video type may be
selected from a set of available video formats, which may
include two or more of: a two-dimensional video format, a
three-dimensional video format, or a holographic video
format. In one example, the one or more reception param-
eters may further include a hardware display type associated
with the processing system, such as: a two-dimensional
display, a three-dimensional ray-based display, a multi-view
display, a virtual reality headset, an augmented reality
headset, or the like.

At step 220, the processing system receives the video
content (e.g., a video stream comprising the video content)
in accordance with the first depth parameter. It should again
be noted that as referred to herein a video call may be a call
in which video of at least one of the participants is streamed
to one or more other participants. In one example, the video
content (e.g., a video stream comprising the video content)
may be received from another endpoint device of a partici-
pant to the video call. Alternatively, the video content may
be received from a network-based system, e.g., a transcod-
ing server, which may obtain a video stream from a source
device and which may alter the obtained video stream to
generate the video stream as received by the processing
system at step 220. For instance, in one example, the video
stream may be a 2D projection of a 3D source video content
(e.g., if the display associated with the processing system is
not 3D capable, and if such limitation is conveyed in the
reception parameters).

At step 230, the processing system presents the video
content in accordance with the first depth parameter. For
instance, the processing system may cause the video content
to be presented on a display (e.g., a display screen, a
projector, an AR headset, etc.). In one example, step 230
may include rendering the video content for display. For
instance, the video content may be a compressed stream for
transmission in accordance H.264 or H.265 (MPEG-4 (Mov-
ing Picture Experts Group-4), H.264/AVC (Advanced Video
Coding) and H.265/HEVC (High Efficiency Video Coding)),
or the like. As such, the processing system may apply
inter-frame decoding, intra-frame decoding, etc., depending
upon the particular formatting. Notably, the video content
may be in accordance with the depth parameter. As such,
video content that may be from distances and/or layers
beyond the depth parameter may not be received (or is
modified an/or blocked if actually received), and therefore
not presented via the display.

At optional step 240, the processing system may receive
a notification of an availability of additional video content at
one or more depths beyond the first depth parameter (e.g.,
further away from the video capture apparatus/viewing
perspective). For instance, as noted above, an endpoint
device associated with the capture of the video content (e.g.,
an endpoint device of another participant of the video call)
may have one or more constraints that may limit the ability
to transmit more video content (e.g., greater depths and/or
more layers). However, conditions may be detected to
change such that an offer of additional video content may be
made. For instance, the notification may indicate availability
of additional video content beyond a current depth param-
eter of 5 feet out to a maximum of 10 feet. In one example, the notification may comprise a call signaling message (e.g., a SIP/SDP message, or the like).

At optional step 250, the processing system may transmit a request for at least a portion of the additional video content. For instance, if the notification indicates availability of additional video content beyond a current depth parameter of 5 feet out to a maximum of 10 feet, the request may specify anywhere from 6 to 10 feet, 5.5 feet to 10 feet, etc. (e.g., depending upon which gradations may be permitted in accordance with a video calling system, etc.). Similarly, a request may specify a number of additional layers and/or the furthest layer that should be provided (e.g., up to layer 7 out of 10, for example). Accordingly, in one example, the request may include a second depth parameter defining a second depth of the additional video content that the processing system is to display. In one example, the request may also comprise a call signaling message (e.g., a SIP/SDP message, or the like).

At optional step 260, the processing system may receive the at least the portion of the additional video content in accordance with the second depth parameter. For instance, in one example, optional step 260 may be the same or similar to step 220 (however for a later time within the video call). Alternatively, in one example, the additional video content may include an additional/new video stream. For instance, in a layered video, each layer may comprise a separate stream that may be requested and received independently. Alternatively, an initial stream may be for the video content in accordance with the first depth parameter. A second stream may be added for at least a portion of the additional video content, e.g., which may comprise visual data from distances between the first depth parameter and the second depth parameter (and/or up to and including a distance defined by the second depth parameter).

At optional step 270, the processing system may present the at least the portion of the additional video content in accordance with the second depth parameter. For instance, in one example, optional step 270 may be the same or similar to step 230 (however for a later time within the video call). In an example in which multiple streams are involved, the processing system may perform additional rendering operations, e.g., to combine visual data from two or more streams for simultaneous presentation via the display.

Following step 230 or any of optional steps 240-270, the method 200 may proceed to step 295. At step 295, the method 200 ends.

It should be noted that the method 200 may be expanded to include additional steps, or may be modified to replace steps with different steps, to combine steps, to omit steps, to perform steps in a different order, and so forth. For instance, in one example the processor may repeat one or more steps of the method 200, such as steps 220-230, steps 220-240, etc. for the duration of the video call. In one example, the method 200 may include receiving notification of a change in the depth parameter (e.g., to a lesser depth), and receiving and displaying the video content in accordance with such a modified depth parameter. For instance, there may be a change in available bandwidth on the capture/upload side that may prevent streaming of video content up the current depth. Thus, the transmitting endpoint device may initiate such a change. Alternatively, or in addition, the processing system may detect rebuffering/stalling (which may not be caused on the receiver side), and may notify the transmitting endpoint device of degraded end-to-end network conditions (and/or may request a lesser depth parameter). In various other examples, the method 200 may further include or may be modified to comprise aspects of any of the above-described examples in connection with FIG. 1, aspects of the below-discussed method 300 of FIG. 3, or as otherwise described in the present disclosure. Thus, these and other modifications are all contemplated within the scope of the present disclosure.

Figure 3:
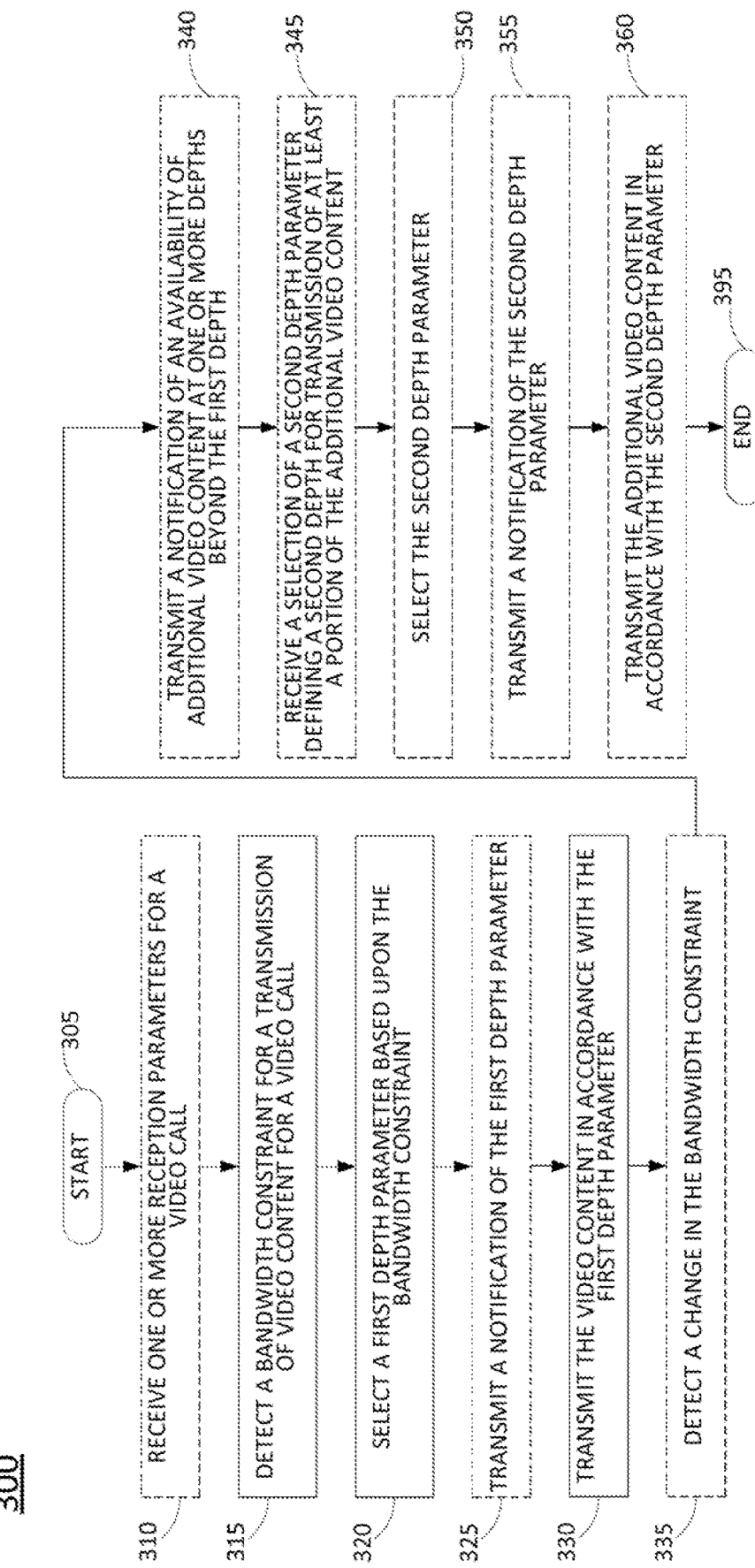
FIG. 3 illustrates a flowchart of an example method for transmitting video content in accordance with a first depth parameter.

FIG. 3 illustrates a flowchart of an example method 300 for transmitting video content in accordance with a first depth parameter, in accordance with the present disclosure. In one example, the method 300 is performed by a component of the system 100 of FIG. 1, such as by one of the devices 141 or 142 and/or any one or more components thereof (e.g., a processor, or processors, performing operations stored in and loaded from a memory), or by a communication system (e.g., device 141 conjunction with one or more other devices, such as display 171, camera array 172, etc. or similarly for device 142, depth-base camera 174, display 175, etc.). In another example, the method 300 may be performed by a network-based processing system, such as AS 104, or multiple servers of a same or similar nature operating as a distributed/collective processing system. In one example, the steps, functions, or operations of method 300 may be performed by a computing device or system 400, and/or processor 402 as described in connection with FIG. 4 below. For instance, the computing device or system 400 may represent any one or more components of the system 100 of FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and proceeds to optional step 310 or to step 315.

At optional step 310, the processing system may receive one or more reception parameters for a video call (e.g., from an endpoint device to receive video content of the video call). For instance, in one example, the one or more reception parameters may be received in at least one call signaling message. In one example, the at least one call up signaling message may comprise an SDP message (e.g., an SDP payload in a SIP message, also referred to herein as SIP/SDP). In one example, the reception parameters may include a requested depth parameter specifying a depth that at least one other participant (or the device(s) thereof) is capable of rendering, displaying (e.g., a processing limitation), and/or receiving (e.g., a downlink bandwidth limitation), or that the participant prefers to receive (e.g., the participant is on a metered network connection and even if it is capable of supporting richer video, the participant may prefer not to utilize it). In one example, the receive parameters may also include information on a display type and/or capability.

At step 315, the processing system detects a bandwidth constraint for a transmission of video content for a video call. For instance, the bandwidth constraint may be for an uplink stream for the video content. For example, the processing system may comprise all or a portion of a communication system participating in the video call, where the processing system is to transmit/upload captured 3D video content of a participant (e.g., in addition to audio content).

At step 320, the processing system selects a first depth parameter based upon the bandwidth constraint (e.g., with more bandwidth, greater depth may be supported, with less bandwidth a lesser depth may be supported). In one example, the selection may be in accordance with a table, rules, or the like that match depth parameters to available bandwidth (and/or predicted bandwidth or the like). For instance, the first depth parameter may be the same or similar to the first depth parameter as described above in connection with the example method 200 of FIG. 2. In one example, the first depth parameter may further be selected based upon the one or more reception parameters. For instance, the processing system may select the first depth parameter to be the lesser of: (1) a requested depth parameter received from an endpoint device of another participant or (2) a depth/depth parameter that can be accommodated with the bandwidth constraint (e.g., so as to permit a video stream to be transmitted over one or more networks and presented at one or more recipient endpoint devices without stalling/rebuffering, etc.).

At optional step 325, the processing system may transmit a notification of the first depth parameter that was used. In one example, the notification may comprise a signaling message (e.g., a SIP/SDP message or the like) of the same or similar nature as described above.

At step 330, the processing system transmits the video content in accordance with the first depth parameter (e.g., transmitting one or more video stream comprising the video content). For instance, in one example, the processing system may record and/or obtain 3D video content. For example, the processing system may comprise or may be in communication with a depth-based camera, a multi-video camera, or the like. In one example, the processing system may extract video content up to the first depth parameter (e.g., a distance and/or a number of layers). In one example, the processing system may discard video content beyond the first depth parameter. In one example, step 330 may further include encoding the video content prior to uploading/transmitting the video content (e.g., as one or more video streams). For instance, the processing system may apply an intra-frame encoding, an inter-frame encoding, and so forth. In one example, step 330 may also include packetizing the video content for the video stream and so forth.

At optional step 335, the processing system may detect a change in the bandwidth constraint. For instance, the processing system may detect that an available bandwidth and/or throughput has increased (or may decrease in a another scenario). In one example, the detection may be from an RTCP message from another endpoint device participating in the call.

At optional step 340, the processing system may transmit a notification of an availability of additional video content at one or more depths beyond the first depth (e.g., when the available bandwidth and/or throughput has increased, e.g., a greater availability of bandwidth). For instance, the processing system may calculate a number of additional layers and/or an increased depth or video content for which streaming of the video content to one or more recipients may be supported (e.g., without stalling/rebuffering, etc.). In one example, the notification may comprise a signaling message (e.g., a SIP/SDP message or the like) of the same or similar nature as described above.

At optional step 345, the processing system may receive a selection of a second depth parameter defining a second depth for transmission of at least a portion of the additional video content (e.g., from an endpoint device of at least one other participant of the video call). In one example, the selection may be contained in a signaling message (e.g., a SIP/SDP message or the like) of the same or similar nature as described above.

At optional step 350, the processing system may select a second depth parameter. For instance, optional step 350 may comprise the same or similar operations as step 320. In one example, the second depth parameter may be chosen based upon the selection that may be received at optional step 345. Alternatively, or in addition, the processing system may select the second depth parameter without such additional input. For instance, when the change in the bandwidth constraint comprises a lesser availability of a bandwidth, the processing system may select a second depth parameter based on the lesser availability.

At optional step 355, the processing system may transmit a notification of the second depth parameter that is used. For instance, optional step 355 may comprise the same or similar operations as step 325.

At optional step 360, the processing system may transmit the additional video content in accordance with the second depth parameter. For instance, in one example, optional step 360 may comprise the same or similar operations as step 330. In one example, the processing system may begin transmitting one or more additional streams (e.g., for a second depth parameter that is greater than the first depth parameter). In another example, the processing system may end one or more streams (e.g., for a second depth parameter that is less that the first depth parameter, and where multiple streams are used to convey the video content at different depths and/or layers).

Following step 330 or any of optional steps 335-360, the method 300 may proceed to step 395. At step 395, the method 300 ends.

It should be noted that the method 300 may be expanded to include additional steps, or may be modified to replace steps with different steps, to combine steps, to omit steps, to perform steps in a different order, and so forth. For instance, in one example the processor may repeat one or more steps of the method 300, such as steps 330-360 for additional bandwidth changes, or changes in other factors that may cause the depth parameter to change, and so forth. In various other examples, the method 300 may further include or may be modified to comprise aspects of any of the above-described examples in connection with FIG. 1 and/or the example method 200 of FIG. 2, or as otherwise described in the present disclosure. For instance, a processing system may perform operations with respect to both transmitting and receiving of video streams for a video call. Thus, these and other modifications are all contemplated within the scope of the present disclosure.

In addition, although not expressly specified above, one or more steps of the example method 200 or the example method 300 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIGS. 2 and 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1, or described in connection with the example method 200 of FIG. 2 and/or the example method 300 of FIG. 3 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for receiving and presenting video content in accordance with a first depth parameter and/or transmitting video content in accordance with a first depth parameter, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for receiving and presenting video content in accordance with a first depth parameter and/or transmitting video content in accordance with a first depth parameter (e.g., a software program comprising computer-executable instructions) can be loaded into memory 404 and executed by hardware processor element 402 to implement the steps, functions or operations as discussed above in connection with the example method (s). Furthermore, when a hardware processor executes instructions to perform "operations," this could include the hardware processor performing the operations directly and/ or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for receiving and presenting video content in accordance with a first depth parameter and/or transmitting video content in accordance with a first depth parameter (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:

transmitting, by a processing system including at least one processor, one or more reception parameters for a video call, wherein the one or more reception parameters include a first depth parameter defining a first depth of video content that the processing system is to display, wherein the first depth defines a first distance up to which to include in the video content, wherein additional video content is available at one or more distances beyond the first distance, and wherein the one or more reception parameters are transmitted in at least one call signaling message;

receiving, by the processing system, the video content in accordance with the first depth parameter;

presenting, by the processing system, the video content in accordance with the first depth parameter; and receiving, by the processing system, a notification of an availability of the additional video content at the one or more distances beyond the first distance.

2. The method of claim 1, wherein the at least one call signaling message comprises a session description protocol message.

3. The method of claim 1, wherein the one or more reception parameters further include at least one of:

a hardware display type associated with the processing system; or a display capability of the processing system.

4. The method of claim 1, wherein the one or more reception parameters further include a video type, and wherein the video type is selected from among two or more of:

a two-dimensional video format;

a three-dimensional video format; or a holographic video format.

5. The method of claim 1, further comprising:

transmitting a request for at least a portion of the additional video content.

6. The method of claim 5, wherein the request includes a second depth parameter defining a second distance of the at least the portion of the additional video content that the processing system is to display.

7. The method of claim 6, further comprising:

receiving the at least the portion of the additional video content in accordance with the second depth parameter; and presenting the at least the portion of the additional video content in accordance with the second depth parameter.

8. The method of claim 1, wherein the first depth parameter is defined as a number of layers of the video content.

9. The method of claim 8, wherein the number of layers comprises at least three layers of the video content are available for selection by the processing system.

10. An apparatus comprising:

a processing system including at least one processor; and a computer-readable medium storing instructions which, when executed by the processing system, cause the processing system to perform operations, the operations comprising:

transmitting one or more reception parameters for a video call, wherein the one or more reception parameters include a first depth parameter defining a first depth of video content that the processing system is to display, wherein the first depth defines a first distance up to which to include in the video content, wherein additional video content is available at one or more distances beyond the first distance, and wherein the one or more reception parameters are transmitted in at least one call signaling message;

receiving the video content in accordance with the first depth parameter;

presenting the video content in accordance with the first depth parameter; and receiving a notification of an availability of the additional video content at the one or more distances beyond the first distance.

11. A method comprising:

receiving, by a processing system including at least one processor, one or more reception parameters for a video call;

detecting, by the processing system, a bandwidth constraint for a transmission of video content for the video call;

selecting, by the processing system, a first depth parameter based upon the bandwidth constraint, the first depth parameter defining a first depth of the video content, wherein the first depth parameter is further selected based upon the one or more reception parameters;

transmitting, by the processing system, a video stream comprising the video content in accordance with the first depth parameter;

receiving, by the processing system, a selection of a second depth parameter defining a second depth for transmission of at least a portion of additional video content;

transmitting, by the processing system, the at least the portion of the additional video content in accordance with the second depth parameter;

detecting, by the processing system, a change in the bandwidth constraint, wherein the change in the bandwidth constraint comprises a greater availability of a bandwidth; and transmitting, by the processing system, a notification of an availability of the additional video content at one or more depths beyond the first depth.

12. The method of claim 11, further comprising:

detecting an additional change in the bandwidth constraint comprising a lesser availability of a bandwidth;

selecting a third depth parameter based on the lesser availability; and transmitting second additional video content of the video call in accordance with the third depth parameter.

13. The method of claim 12, further comprising:

transmitting a notification of the third depth parameter.

14. The apparatus of claim 10, wherein the at least one call signaling message comprises a session description protocol message.

15. The apparatus of claim 10, wherein the one or more reception parameters further include at least one of:

a hardware display type associated with the processing system; or a display capability of the processing system.

16. The apparatus of claim 10, wherein the one or more reception parameters further include a video type, and wherein the video type is selected from among two or more of:

a two-dimensional video format;

a three-dimensional video format; or a holographic video format.

17. The apparatus of claim 10, wherein the operations further comprise:

transmitting a request for at least a portion of the additional video content.

18. The apparatus of claim 17, wherein the request includes a second depth parameter defining a second distance of the at least the portion of the additional video content that the processing system is to display.

19. The apparatus of claim 18, wherein the operations further comprise:

receiving the at least the portion of the additional video content in accordance with the second depth parameter; and presenting the at least the portion of the additional video content in accordance with the second depth parameter.

20. The apparatus of claim 10, wherein the first depth parameter is defined as a number of layers of the video content.

* * * * *